(No Model.)

A. FOGELI.
FRUIT PICKER.

No. 452,102. Patented May 12, 1891.

Witnesses,

Inventor,
Amalea Fogeli
By Dewey & Co.
Atty.

UNITED STATES PATENT OFFICE.

AMALEA FOGELI, OF NEVADA CITY, CALIFORNIA.

FRUIT-PICKER.

SPECIFICATION forming part of Letters Patent No. 452,102, dated May 12, 1891.

Application filed October 29, 1890. Serial No. 369,732. (No model.)

*To all whom it may concern:*

Be it known that I, AMALEA FOGELI, a citizen of the United States, residing at Nevada City, Nevada county, State of California, have invented an Improvement in Fruit-Pickers; and I hereby declare the following to be a full, clear, and exact description of the same.

My invention relates to a novel device for picking fruit; and it consists of the construction and combination of devices, hereinafter fully described and claimed.

Figure 1:
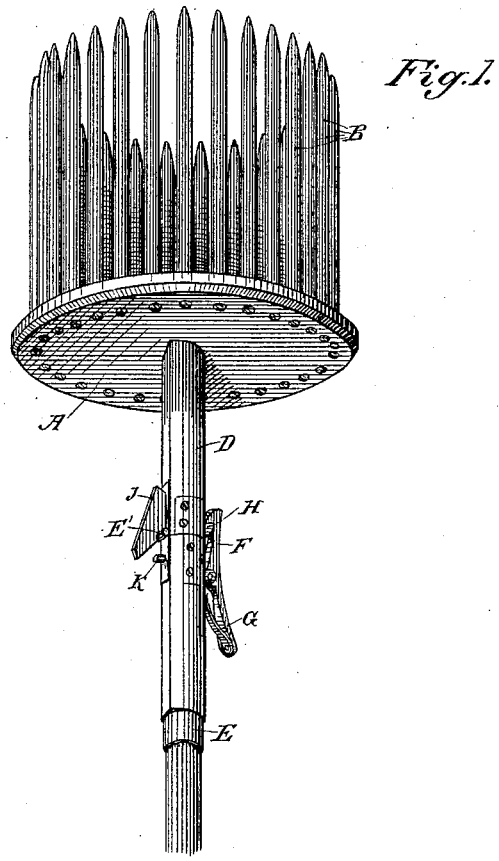
Figure 2:
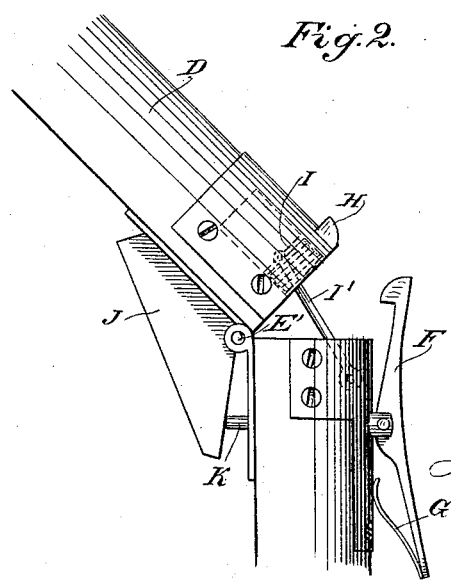

Referring to the accompanying drawings for a more complete explanation of my invention, Figure 1 is a view of my fruit-picker with the handle in the normal position. Fig. 2 shows the joint in the handle bent so as to facilitate the discharge of the fruit from the picker.

A is the base or bottom of the picking device, which may be made of wood, metal, or any suitable or convenient material. Around the periphery of this base is bored a number of holes, within which are fixed the long pointed pins B, which stand in a circle around the base projecting at right angles with one of its faces. To the center of the opposite side of the base is fixed the handle D. This handle may be made in a single piece, or it may be made with a socket E, which enables me to attach handles of different lengths to suit the height of the tree or the position of the fruit to be picked.

In order to pick fruit—such as apples, peaches, pears, or any similar fruit which is liable to be bruised by falling—it is only necessary to raise the device so that the stem of the fruit will pass between any two of the pins B, these pins being sufficiently far apart for that purpose, while the fruit remains within the circle of the pins resting on the bottom or base A. By a slight turn or twist of the device, the stem will then be separated and the fruit will remain safely within the circle of the pins.

It will be manifest that this device may be made of any suitable or convenient size, so as to hold from one to several of any kind of fruit, and as many may be picked at any one time as the device will safely hold, after which they may be carefully deposited in any desired receptacle or place.

In order to facilitate the discharge or deposit of the fruit which is contained within the picker, and especially when a long handle is used, I have shown the handle as being separated into two parts at a point near the picker, and these two parts are connected by the hinge E', so that the handle may be closed in a straight line, or may be turned or opened, so that the upper part will stand at a considerable angle with the lower part.

Upon the opposite side of the handle from the hinge is fulcrumed the latch F, having a spring G, by which it is actuated. This portion of the latch is fulcrumed upon either part of the handle. In the present case I have shown it as fixed upon the lower portion, and the corresponding catch, with which this latch engages, is shown at H, fixed upon the other part of the handle. The interior of the handle at this side is slotted or chambered to receive a spring I, which is fixed into one part of the handle, and a bar I', pivoted in the other portion of the handle, extends up through the spring I, and has a washer or cross-pin above the spring, whereby, when the spring is compressed, its expansive tendency acts upon the bar I' to close and latch the parts of the handle.

Upon one portion of the hinge E' is fixed a projecting plate or stop J, and upon the other portion of the hinge is a pin K, and these two limit the motion about the hinge.

The operation will then be as follows: When a sufficient quantity of fruit has been collected to fill the picker, by pressing upon the spring-latch it is disengaged and the upper portion of the handle with the picker may be turned about the hinge until the picker is at such an angle as to safely discharge its contents, after which the handle is returned to its ordinary position and latched again.

Having thus described my invention, what I claim as new, and desire to secure by Letters Patent, is—

A fruit-picker consisting of the disk having a circle of pins surrounding its periphery with intervals between them, so as to form a cylindrical receptacle upon one side of the disk, a sectional handle projecting from the center of the opposite side of the disk, a hinge-joint between the sections of the handle, a latch on one section of said handle, a spring within one section of said handle connected with the opposite section, and a stop for limiting the separation of the parts of the handle, substantially as herein described.

In witness whereof I have hereunto set my hand.

AMALEA FOGELI.

Witnesses:
S. H. NOURSE,
H. C. LEE.